United States Patent
Eisengruber

(10) Patent No.: US 10,711,885 B2
(45) Date of Patent: Jul. 14, 2020

(54) COUPLING AND ELECTROMECHANICAL CONTROL ASSEMBLY AND ELECTROMECHANICAL SYSTEM FOR USE THEREIN

(71) Applicant: MEANS INDUSTRIES, INC., Saginaw, MI (US)

(72) Inventor: Gregory M. Eisengruber, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 562 days.

(21) Appl. No.: 15/667,837

(22) Filed: Aug. 3, 2017

(65) Prior Publication Data

US 2018/0045306 A1 Feb. 15, 2018

Related U.S. Application Data

(60) Provisional application No. 62/372,867, filed on Aug. 10, 2016.

(51) Int. Cl.
*F16H 63/34* (2006.01)
*F16H 61/28* (2006.01)
(Continued)

(52) U.S. Cl.
CPC .............. *F16H 61/30* (2013.01); *F16D 28/00* (2013.01); *F16H 63/34* (2013.01); *F16D 11/06* (2013.01);
(Continued)

(58) Field of Classification Search
CPC ............. F16H 63/34; F16H 2061/2833; F16H 2061/283; F16D 28/00; F16D 11/06; F16D 2023/123
(Continued)

(56) References Cited

U.S. PATENT DOCUMENTS 2,947,537 A 8/1960 Littell et al.
2,959,062 A 11/1960 Looker
(Continued)

FOREIGN PATENT DOCUMENTS

| CN | 103765028 A | 4/2014 |
| CN | 204238040 | 4/2015 |
| CN | 204238040 U | 4/2015 |

OTHER PUBLICATIONS

The International Bureau of WIPO, International Preliminary Report on Patentability for International Application No. PCT/US2017/045232 dated Feb. 21, 2019.
(Continued)

*Primary Examiner* — Ha Dinh Ho
(74) *Attorney, Agent, or Firm* — Brooks Kushman P.C.

(57) ABSTRACT

A coupling and electromechanical control assembly and an electromechanical system for controlling the operating mode of a selectable clutch assembly are provided. The system includes a control member mounted for controlled rotation about a first axis. An actuator and transmission assembly includes a rotary output shaft and a set of interconnected transmission elements including a cam coupled to the output shaft to rotate therewith and a reciprocating member having a first end which rides in or on the cam to cause the reciprocating member to reciprocate upon rotation of the output shaft. A second end of the reciprocating member is coupled to the control member for selective, small-displacement, control member angular rotation about the first axis between different angular positions which correspond to different operating modes of the clutch assembly.

20 Claims, 3 Drawing Sheets

(51) Int. Cl.
*F16D 28/00* (2006.01)
*F16D 11/06* (2006.01)
*F16D 23/12* (2006.01)
*F16H 61/30* (2006.01)

(52) U.S. Cl.
CPC .. *F16D 2023/123* (2013.01); *F16H 2061/283* (2013.01); *F16H 2061/2823* (2013.01)

(58) Field of Classification Search
USPC .......................................................... 74/335
See application file for complete search history.

(56) References Cited

U.S. PATENT DOCUMENTS

| | | | |
|---|---|---|---|
| 4,050,560 | A | 9/1977 | Torstenfelt |
| 4,340,133 | A | 7/1982 | Blersch |
| 4,651,847 | A | 3/1987 | Hermanns |
| 5,927,455 | A | 7/1999 | Baker et al. |
| 6,193,038 | B1 | 2/2001 | Scott et al. |
| 6,244,965 | B1 | 6/2001 | Klecker et al. |
| 6,290,044 | B1 | 9/2001 | Burgman et al. |
| 6,481,551 | B1 * | 11/2002 | Ruth .................. F16D 41/125 192/103 C |
| 6,607,292 | B2 | 8/2003 | Gutierrez et al. |
| 6,905,009 | B2 | 6/2005 | Reed et al. |
| 7,171,715 | B2 * | 2/2007 | Yoon ..................... D06F 37/40 68/12.24 |
| 7,198,587 | B2 | 4/2007 | Samie et al. |
| 7,258,214 | B2 | 8/2007 | Pawley et al. |
| 7,275,628 | B2 | 10/2007 | Pawley et al. |
| 7,344,010 | B2 | 3/2008 | Fetting, Jr. et al. |
| 7,464,801 | B2 | 12/2008 | Wittkopp |
| 7,484,605 | B2 | 2/2009 | Pawley et al. |
| 7,491,151 | B2 | 2/2009 | Maguire et al. |
| 7,743,678 | B2 | 6/2010 | Wittkopp et al. |
| 7,766,790 | B2 | 8/2010 | Stevenson et al. |
| 7,942,781 | B2 | 5/2011 | Kimes |
| 7,992,695 | B2 | 8/2011 | Wittkopp et al. |
| 8,051,959 | B2 | 11/2011 | Eisengruber |
| 8,061,496 | B2 | 11/2011 | Samie et al. |
| 8,079,453 | B2 | 12/2011 | Kimes |
| 8,272,488 | B2 | 9/2012 | Eisengruber et al. |
| 8,286,772 | B2 | 10/2012 | Eisengruber |
| 8,602,187 | B2 | 12/2013 | Prout |
| 2004/0238306 | A1 | 12/2004 | Reed et al. |
| 2006/0185957 | A1 | 8/2006 | Kimes et al. |
| 2006/0278486 | A1 * | 12/2006 | Pawley ................. F16D 41/125 192/43.1 |
| 2007/0034470 | A1 | 2/2007 | Fetting, Jr. et al. |
| 2008/0110715 | A1 | 5/2008 | Pawley |
| 2008/0169165 | A1 | 7/2008 | Samie et al. |
| 2008/0169166 | A1 | 7/2008 | Wittkopp et al. |
| 2008/0185253 | A1 | 8/2008 | Kimes |
| 2008/0223681 | A1 * | 9/2008 | Stevenson ............. B60W 20/00 192/43 |
| 2009/0159391 | A1 | 1/2009 | Eisengruber |
| 2009/0194381 | A1 | 8/2009 | Samie et al. |
| 2009/0211863 | A1 * | 8/2009 | Kimes .................... F16D 41/16 192/43.1 |
| 2009/0255773 | A1 | 10/2009 | Seufert et al. |
| 2010/0022342 | A1 | 1/2010 | Samie et al. |
| 2010/0230226 | A1 | 9/2010 | Prout |
| 2010/0252384 | A1 | 10/2010 | Eisengruber |
| 2010/0255954 | A1 | 10/2010 | Samie et al. |
| 2011/0177900 | A1 | 7/2011 | Simon |
| 2011/0183806 | A1 | 7/2011 | Wittkopp et al. |
| 2011/0192697 | A1 | 8/2011 | Prout et al. |
| 2012/0152687 | A1 | 1/2012 | Kimes et al. |
| 2012/0090952 | A1 | 4/2012 | Lee et al. |
| 2012/0145506 | A1 | 6/2012 | Samie et al. |
| 2012/0152683 | A1 | 6/2012 | Kimes |
| 2013/0062151 | A1 | 3/2013 | Pawley |
| 2014/0190785 | A1 | 7/2014 | Fetting et al. |
| 2016/0129864 | A1 | 5/2016 | Essenmacher |
| 2016/0131205 | A1 | 5/2016 | Essenmacher |
| 2016/0131206 | A1 | 5/2016 | Essenmacher |
| 2016/0298277 | A1 | 10/2016 | Ito |

OTHER PUBLICATIONS

John A. Newell and Holbrook L. Horton, et al., Ingenious Mechanisms for Designers and Inventors, vol. IV, Industrial Press Inc.
Chinese Patent Office, First Chinese Office Action for Chinese Patent Application No. 201780048913.2 dated Dec. 2, 2019.
Newell et al. Ingenious Mechanisms for Designers and Inventors vol. IV, Industrial Press Inc. 1967; vol. 4 Jones 1930 pp. 186-193.
PCT/US2017/045232 International Search Report dated Oct. 13, 2017.

* cited by examiner

COUPLING AND ELECTROMECHANICAL CONTROL ASSEMBLY AND ELECTROMECHANICAL SYSTEM FOR USE THEREIN

CROSS-REFERENCE TO RELATED APPLICATIONS

This application claims the benefit of U.S. provisional application Ser. No. 62/372,867 filed Aug. 10, 2016, the disclosure of which is hereby incorporated in its entirety by reference herein.

TECHNICAL FIELD

This invention relates to coupling and electromechanical control assemblies and systems for controlling the operation mode of selectable clutch assemblies.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

- roller type which includes spring-loaded rollers between inner and outer races of the one-way clutch. (Roller type is also used without springs on some applications); and
- sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC in a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2009/0194381; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

U.S. Pat. No. 8,272,488 discloses in its FIGS. 9a-9c, a "perpendicular actuating shift valve" latching mechanism, generally indicated at 500. A control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the grooves 510 lock the pin 508 therebetween to prevent movement of the pin 508 in a direction parallel to the shift direction of the control plate 502. The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514. Compression springs 516, also disposed within the bore 513, are biased between a cover 518 of the housing 514 and one end 520 of the valve 512. Application of a control pressure 522 through a control portion 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512. One of the struts 504 now extends through an aperture 530 formed in the control plate 502 to lock the one-way clutch.

Other U.S. patent publications which disclose controllable or selectable one-way clutches include U.S. Pat. Nos. 6,193,038; 7,198,587; 7,275,628; 8,602,187; and 7,464,801, and U.S. Publication Application Nos. 2007/0278061; 2008/0110715; 2009/0159391; 2009/0211863; 2010/0230226; and 2014/0190785.

Other U.S. patent documents related to the present application include: U.S. Pat. Nos. 2,947,537; 2,959,062; 4,050,560; 4,340,133; 4,651,847; 6,607,292; 6,905,009; 7,942,781; 8,061,496; 8,286,772; 2004/0238306; 2006/0185957; 2007/0034470; 2009/0255773; 2010/0022342; 2010/0255954; 2011/0177900; 2012/0090952; 2012/0152683; 2012/0152687; 2016/0131205; 2016/0131206; and 2016/0129864.

For purposes of this application, the term "coupling" should be interpreted to include clutches or brakes wherein one of the plates is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of the one-way clutch. The pockets are formed in the planar surface of the pocket plate. Each pocket receives a torque transmitting strut, one end of which engages an anchor point in a pocket of the pocket plate. An opposite edge of the strut, which may hereinafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

SUMMARY OF EXAMPLE EMBODIMENTS

An object of at least one embodiment of the present invention is to provide an electromechanical system and a coupling and electromechanical control assembly wherein a cam is coupled to a rotary output shaft and a reciprocating member rides on the cam and is coupled to a control member which controls the operating mode of a selectable clutch assembly.

In carrying out the above object and other objects of at least one embodiment of the present invention, an electromechanical system for controlling the operating mode of a selectable clutch assembly is provided. The system includes a control member mounted for controlled rotation about a first axis. An actuator and transmission assembly includes a rotary output shaft and a set of interconnected transmission elements including a cam coupled to the output shaft to rotate therewith and a reciprocating member having a first end which rides in or on the cam to cause the reciprocating member to reciprocate upon rotation of the output shaft. A second end of the reciprocating member is coupled to the control member for selective, small-displacement, control member angular rotation about the first axis between angular positions which correspond to different operating modes of the clutch assembly.

The control member may be a control or selector plate rotatable about the first axis.

The control member may have at least one opening which extends completely therethrough.

The actuator and transmission assembly may include a motor having the output shaft for driving the control member.

The cam may have a contour surface which defines a groove wherein the first end of the reciprocating member rides on the contour surface of the groove.

The groove may be a curved groove extending about a rotary axis of the output shaft.

Further in carrying out the above object and other objects of at least one embodiment of the present invention, a coupling and electromechanical control assembly is provided. The assembly includes a coupling subassembly including first and second coupling members having first and second coupling faces, respectively, in close-spaced opposition with one another. At least one of the members is mounted for rotation about a first axis. A control member is mounted for controlled rotation about the first axis between the coupling faces. An actuator and transmission subassembly includes a rotary output shaft and a set of interconnected transmission elements including a cam coupled to the output shaft to rotate therewith and a reciprocating member having a first end which rides in or on the cam to cause the reciprocating member to reciprocate upon rotation of the output shaft. A second end of the reciprocating member is coupled to the control member for selective, small-displacement, control member angular rotation about the first axis between different angular positions which correspond to different operating modes of the coupling subassembly.

The control member may be a control or selector plate rotatable about the first axis.

The actuator and transmission subassembly may include a motor having the output shaft for driving the control member.

One of the coupling members may include an axially extending wall having an elongated slot extending therethrough wherein the reciprocating member linearly reciprocates in the elongated slot.

The cam may have a contour surface which defines a groove wherein the first end of the reciprocating member rides on the contour surface in the groove.

The groove may be a curved groove extending about a rotary axis of the output shaft.

The assembly may further include a locking member disposed between the coupling faces of the coupling members. The locking member may be movable between coupling and uncoupling positions. The control member may be operable to control position of the locking member.

The locking member may be a locking strut.

The control member may have at least one opening which extends completely therethrough to allow the locking member to extend therethrough to the coupling position of the locking member in a control position of the control member. One of the coupling members may include a notch plate and the other of the coupling members may include a pocket plate.

The coupling members may be clutch members, the coupling faces may be clutch faces and the control member may be a selector plate.

The coupling faces may be oriented to face axially with respect to the first axis.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
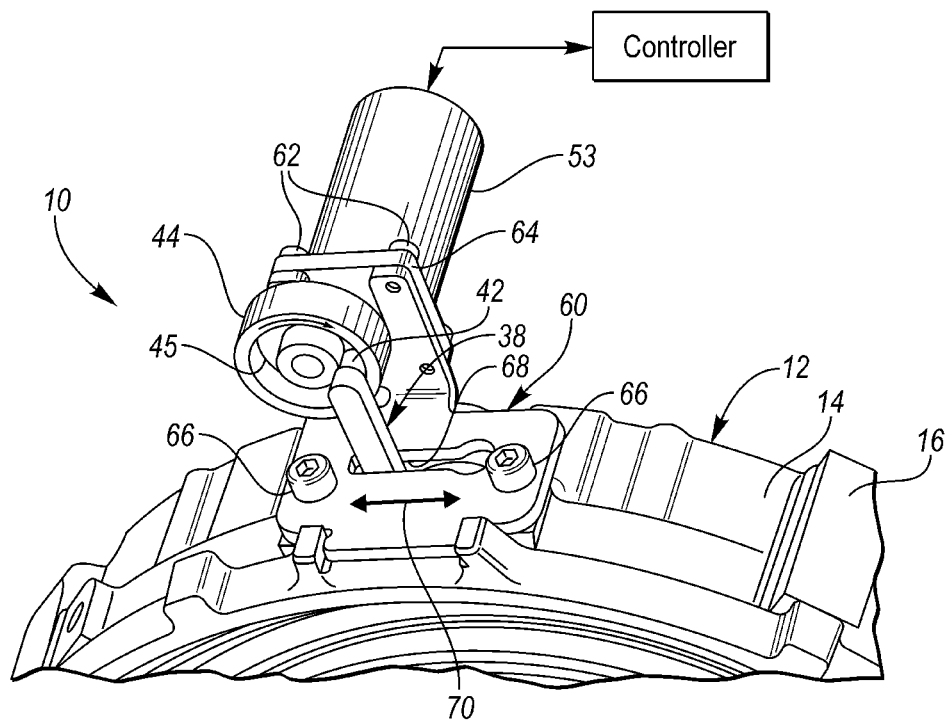
FIG. 1 is a schematic perspective front view, partially broken away, of a coupling an electromechanical control assembly together with a controller constructed in accordance with at least one embodiment of the present invention.
Figure 2:
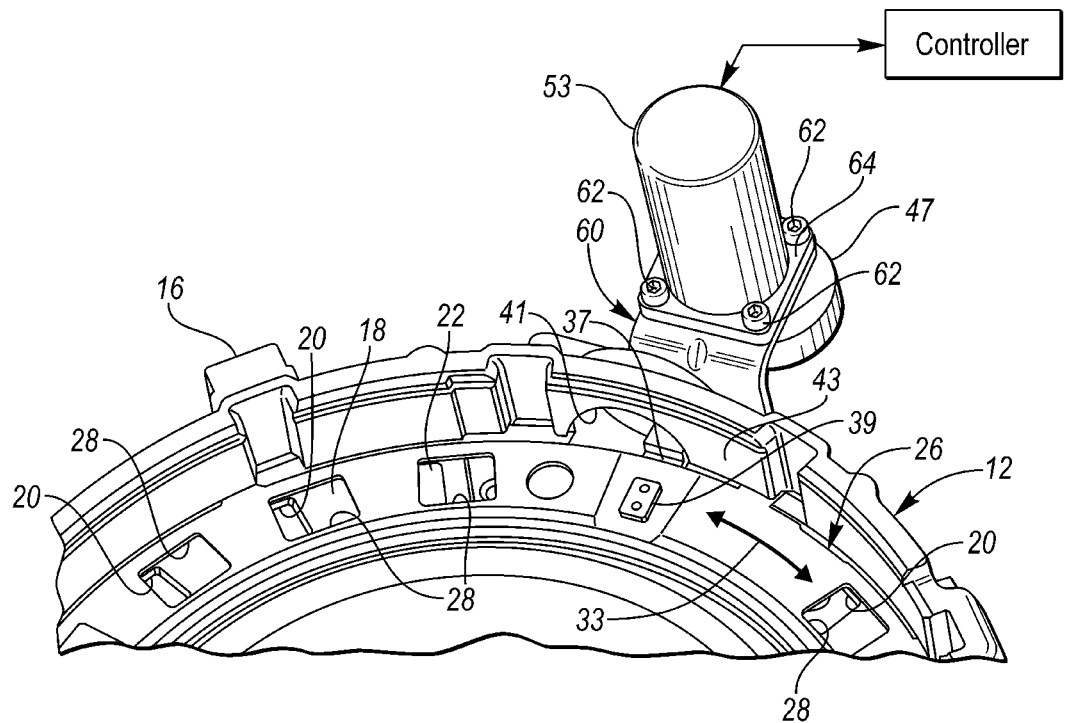
FIG. 2 is a schematic perspective rear view, partially broken away, of the assembly and controller of FIG. 1 and without a notch plate to illustrate one position of control member or plate which controls the operating mode of a selectable clutch assembly.
Figure 3:
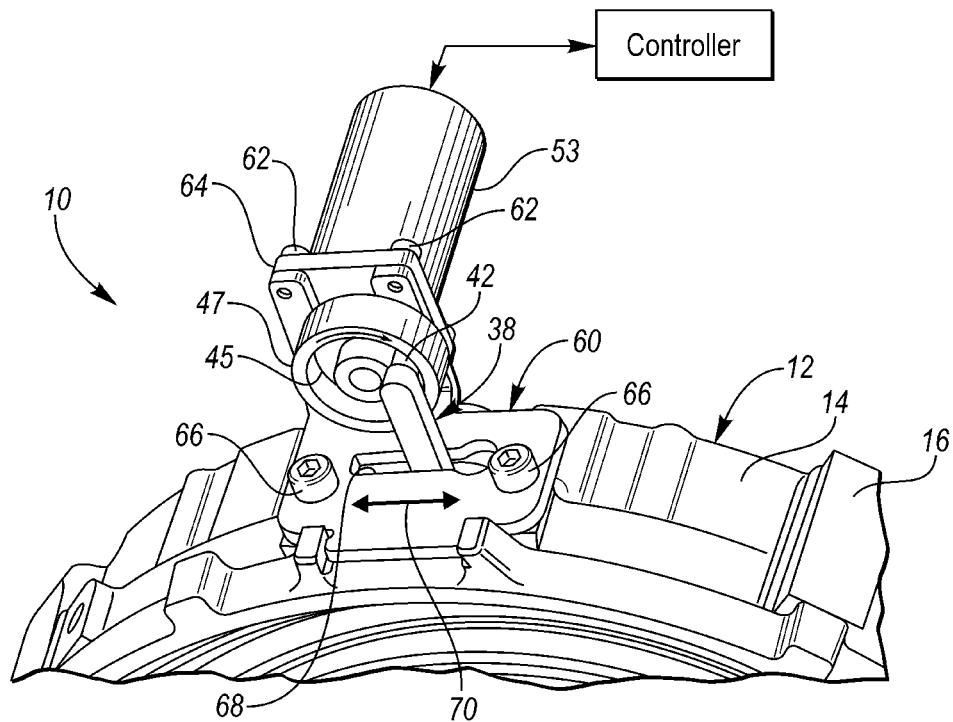
FIG. 3 is a view, similar to the view of FIG. 1 but showing a reciprocating member of the assembly in a different control position which corresponds to an operating mode different from the operating mode of FIGS. 1 and 2.
Figure 4:
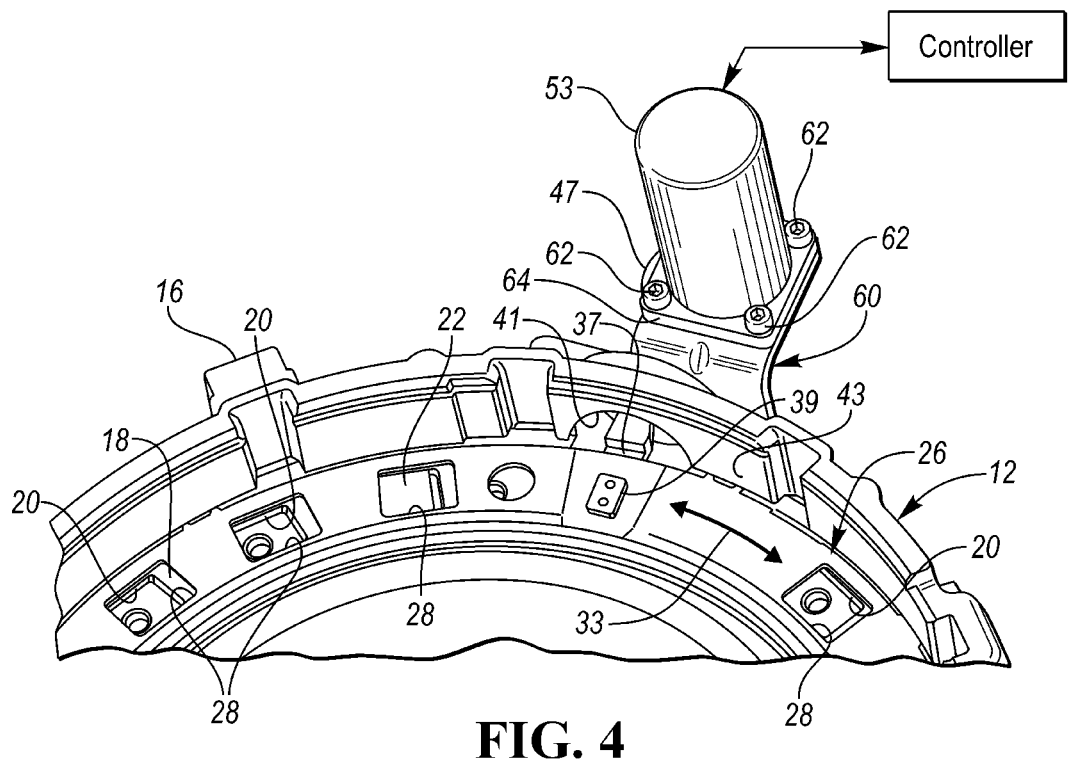
FIG. 4 is a view similar to the view of FIG. 2 wherein the operating mode is the same as in FIG. 3.
Figure 5:
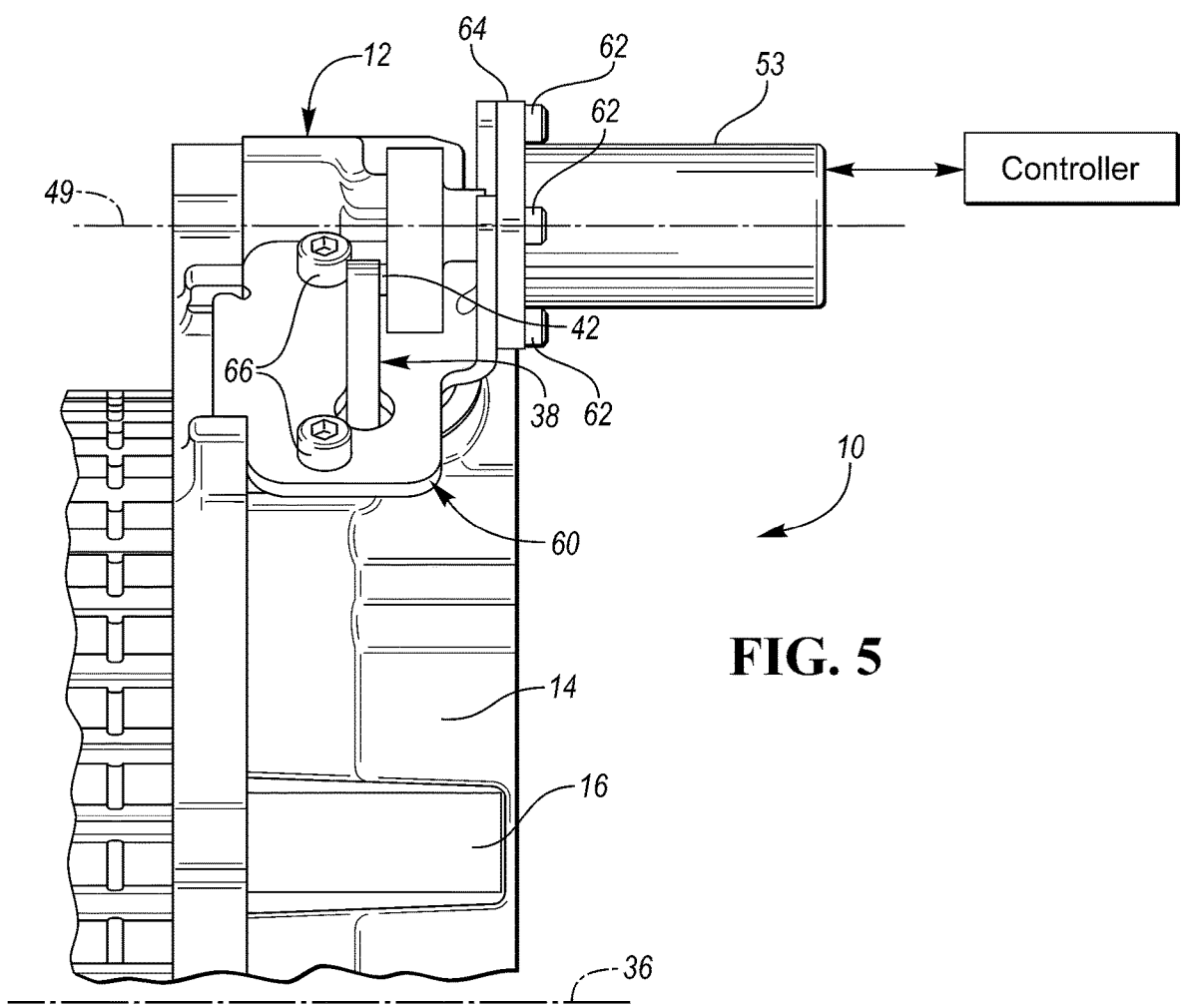
FIG. 5 is a top plan view of the assembly of FIGS. 1 through 4.

Referring to the drawing figures, FIGS. 1-5 illustrate a coupling and electromechanical control assembly, generally indicated at 10, constructed in accordance with at least one embodiment of the present invention. However, it is to be understood that the present invention can be utilized with a wide variety of selectable clutches, such as clutches having three or more operating modes or states. In fact, the present invention may be used with controllable mechanical diodes (CMDs) having an infinite number of operating modes or mechanical states.

As described in U.S. Pat. No. 8,602,187, and published U.S. patent application No. 2014/0190785, both assigned to the assignee of the present application, the assembly 10 typically includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs (not shown) disposed in the pockets 20 under their respective struts 22. Preferably, twelve reverse struts 22 are provided. However, it is to be understood that a greater or lesser number of reverse struts 22 may be provided.

The assembly 10 also includes a control member or element in the form of a selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches (not shown) formed in a radially extending surface or coupling face of a forward or inner plate or coupling member (not shown) when the plate 26 is properly angularly positioned about a common central rotational first axis 36 (FIG. 5) by a reciprocating transmission element in the form of an actuator link or arm, generally indicated at 38. One end 37 of the arm 38 is coupled or secured to the plate 26 to move therewith by a plate and fastener subassembly 39.

The arm 38 may extend through a notch or elongated slot 41 formed through a wall or wall portion of an outer circumferential end wall 43 of the plate 12 as shown in U.S. Pat. No. 8,602,187. An opposite end 42 of the arm 38 rides a curved groove 45 which is defined by a contour surface of a cam 47. The groove 45 may be an endless annular groove which extends about a rotary axis 49 (FIG. 5) of an output shaft (not shown) of an electric motor 53. The cam 47 is preferably eccentrically mounted on the output shaft of the motor 53 to provide the reciprocating movement. The groove 45 may alternatively have ends, wherein the motor 53 may be reversible. The motor 53 need not be an electric motor but may be a hydraulic or pneumatic rotary actuator such as a hydraulic or pneumatic motor, respectively. The cam 47 is coupled to the output shaft to rotate therewith.

The motor 53 is mounted on the surface 14 by a mounting bracket, generally indicated at 60. Fasteners 62 fasten the mounting bracket 60 to a flange 64 of the motor 53. One portion of the bracket 60 is fastened to the plate 12 by fasteners 66. An elongated slot 68 is formed in the portion of the bracket 60. The slot 68 is aligned with the slot 41 formed through the wall 43 to permit reciprocating movement of the arm 38 as indicated by arrows 70. The arm 38 may move or reciprocate in the slot 41 between different use positions to cause the plate 26 to slide or shift between its control positions as indicated by arrows 33 to alternately cover or uncover the struts 22 (i.e., to engage or disengage the reverse struts 22, respectively).

The arm 38 has a control position to disengage the reverse struts 22. In one embodiment, the arm 38 is rotated about 7° in a forward overrun direction about the axis 36 to rotate the selector plate 26 to, in turn, allow the reverse struts 22 to move from their disengaged position in their pockets 20 to their engaged position with the notches (not shown) of the inner plate.

An electromechanical system for controlling the operating mode or state of the selectable clutch assembly 10 is typically a single-direction, electrically-powered, actuator assembly, coupled to the control member or plate 26 for selective, small-displacement, control member or plate movement between first and second positions which correspond to first and second operating modes of the clutch assembly 10, respectively. As previously mentioned, more than two positions may be provided such as three positions of a three state CMD. In fact, at least in theory, an infinite number of states can be supported.

The actuator assembly holds the control member 26 in a position commanded by the controller after electrical power to the actuator assembly has been purposefully terminated.

As described above, the cam 47 includes a cam groove 45 to interface with one end of the actuator arm 38. The groove 45 traps the actuator arm 38, translating the rotary motion of the cam 47 into reciprocating motion of the arm 38 and rotary motion of the selector plate 26. Geometry of the groove 45 creates two "parking spots" for the actuator arm 38. Each "parking spot" is included so that the internal forces of the clutch assembly on the selector plate 26 and actuator arm 38 cannot result in the actuator arm 38 inadvertently moving in the groove 45. The "parking spots" in cam 47 prevent the internal forces of the clutch assembly from causing an inadvertent change of clutch assembly mode or state.

A vehicle's transmission electronic control unit (TECU) provides and regulates the power to drive the motor 53. The controller of FIGS. 1-5 may be coupled to the motor 53 so that control of the motor 53 is achieved.

The TECU can either directly supply or indirectly control supply power to the controller. There is an advantage in the indirect control method as the controller's current consumption is not limited by the capabilities of the TECU. The TECU retains the ability remove power to the controller.

The remote transmission ECU (TECU) typically has a microprocessor, called a central processing unit (CPU), in communication with a memory management unit (MMU). The MMU controls the movement of data among the various computer readable storage media and communicates data to and from the CPU. The computer readable storage media preferably include volatile and nonvolatile storage in read-only memory (ROM), random-access memory (RAM), and keep-alive memory (KAM). For example, KAM may be used to store various operating variables while CPU is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU in controlling the transmission or vehicle into which the transmission is mounted.

The computer-readable storage media may also include floppy disks, CD-ROMs, hard disks, and the like. CPU communicates with various sensors, switches and/or actuators directly or indirectly via an input/output (I/O) and actuators directly or indirectly via an input/output (I/O) interface or vehicle bus (i.e., CAN, LIN, etc.). The interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU. Some controller architectures do not contain an MMU. If no MMU is employed, the CPU manages data and connects directly to ROM, RAM, and KAM coupled to the MMU or CPU depending upon the particular application.

The various components or functions of the motor controller may be implemented by the separate motor controller as illustrated, or may be integrated or incorporated into the transmission ECU, or other controller, depending upon the particular application and implementation. The MCU typically include the control logic to control the actuator assembly. The control logic may be implemented in hardware, software, or a combination of hardware and software.

As will be appreciated by one of ordinary skill in the art, one or more memory devices within the transmission ECU and/or the motor controller may store a plurality of activation schemes for the control member or plate 26 and may represent any one or more of a number of known processing strategies such as event-driven, interrupt-driven, multi-tasking, multi-threading, and the like. As such, various steps or functions may be performed in sequence, in a modified sequence, in parallel, or in some cases omitted. Likewise, the order of operation or processing is not necessarily required to achieve the objects, features, and advantages of the invention, but is provided for ease of illustration and description.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer to control the control member 26 of the system through the actuator assembly. The computer-readable storage medium or media may be any of a number of known physical devices which utilize electric, magnetic, and/or optical devices to temporarily or persistently store executable instructions and associated calibration information, operating variables, and the like.

In one example embodiment, the control member or plate 26 is electromechanically driven by the actuator assembly including a rotary actuator such as the electric motor 53 and associated transmission. The motor 53 may be, for example, a brushed or brushless DC servomotor, or a stepper motor, the operation of which is controlled by the motor controller via a motor drive or driver within the motor controller. The motor 53 may have its rotary speed and position controlled by pulse width modulation (PWM) control so that the position of the control member or plate 26 is adjusted.

The TECU and the motor controller are connected via the vehicle bus such as a local interconnect network (LIN or CAN) line or bus capable of two-way communications. LIN is one of many possible in-vehicle local area network (LAN) communications protocols. A power line and a ground line may be provided between the TECU and the motor controller. The motor controller typically includes a transceiver interface within the MCU, a microprocessor and its control logic within the MCU, and the motor drive or driver, and an electrical power source. The motor controller may be integrated or physically coupled with the DC motor in the clutch housing, while the TECU is provided some distance away from the clutch housing.

The MCU of the motor controller typically includes a memory and may be configured as a conventional microcomputer including a CPU, a ROM, a RAM and the like or as a hardwired logic circuit.

The TECU and the motor controller may perform data communications regularly through the LIN or CAN bus. In such data communications, the motor controller may transmit state data indicating the state of the DC motor to the TECU. The state data may include a present rotation position of the DC motor, that is, count value of a rotation position counter stored in a memory of the MCU of the motor controller.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromechanical system for controlling the operating mode of a selectable clutch assembly, the system comprising:
a control member mounted for controlled rotation about a first axis; and
an actuator and transmission assembly including a rotary output shaft and a set of interconnected transmission elements including a cam coupled to the output shaft to rotate therewith and a reciprocating member having a first end which rides in or on the cam to cause the reciprocating member to reciprocate upon rotation of the output shaft and a second end coupled to the control member for selective, small-displacement, control member angular rotation about the first axis between different angular positions which correspond to different operating modes of the clutch assembly.

2. The system as claimed in claim 1, wherein the control member is a control or selector plate rotatable about the first axis.

3. The system as claimed in claim 1, wherein the control member has at least one opening which extends completely therethrough.

4. The system as claimed in claim 1, wherein the actuator and transmission assembly includes a motor having the output shaft for driving the control member.

5. The system as claimed in claim 1, wherein the cam has a contour surface which defines a groove and wherein the first end of the reciprocating member rides on the contour surface in the groove.

6. The system as claimed in claim 5, wherein the groove is a curved groove extending about a rotary axis of the output shaft.

7. A coupling and electromechanical control assembly comprising:
a coupling subassembly including first and second coupling members having first and second coupling faces, respectively, in close-spaced opposition with one another, at least one of the members being mounted for rotation about a first axis;
a control member mounted for controlled rotation about the first axis between the coupling faces; and
an actuator and transmission subassembly including a rotary output shaft and a set of interconnected transmission elements including a cam coupled to the output shaft to rotate therewith and a reciprocating member having a first end which rides in or on the cam to cause the reciprocating member to reciprocate upon rotation of the output shaft and a second end coupled to the control member for selective, small-displacement, control member angular rotation about the first axis between different angular positions which correspond to different operating modes of the coupling subassembly.

8. The assembly as claimed in claim 7, wherein the control member is a control or selector plate rotatable about the first axis.

9. The assembly as claimed in claim 7, wherein the actuator and transmission subassembly includes a motor having the output shaft for driving the control member.

10. The assembly as claimed in claim 7, wherein one of the coupling members includes an axially extending wall having an elongated slot extending therethrough and wherein the reciprocating member linearly reciprocates in the elongated slot.

11. The assembly as claimed in claim 7, wherein the cam has a contour surface which defines a groove and wherein the first end of the reciprocating member rides on the contour surface in the groove.

12. The assembly as claimed in claim 11, wherein the groove is a curved groove extending about a rotary axis of the output shaft.

13. The assembly as claimed in claim 7, further comprising a locking member disposed between the coupling faces of the coupling members, the locking member being movable between coupling and uncoupling positions, the control member being operable to control position of the locking member.

14. The assembly as claimed in claim 13, wherein the locking member is a locking strut.

15. The assembly as claimed in claim 13, wherein the control member has at least one opening which extends completely therethrough to allow the locking member to extend therethrough to the coupling position of the locking member in a control position of the control member.

16. The assembly as claimed in claim 7, wherein one of the coupling members includes a notch plate and the other of the coupling members includes a pocket plate.

17. The assembly as claimed in claim 7, wherein the coupling members are clutch members, the coupling faces are clutch faces and the control member is a selector plate.

18. The assembly as claimed in claim 7, wherein the coupling faces are oriented to face axially with respect to the first axis.

19. The system as claimed in claim 1, wherein the assembly is electrically-powered.

20. The assembly as claimed in claim 7, wherein the subassembly is electrically-powered.

* * * * *